May 4, 1943.  F. J. JOHNS  2,318,076
MOTOR PROTECTIVE DEVICE
Filed May 31, 1940
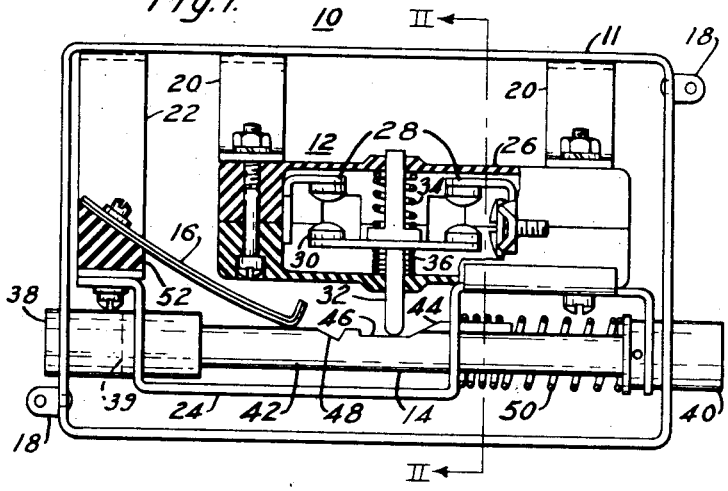
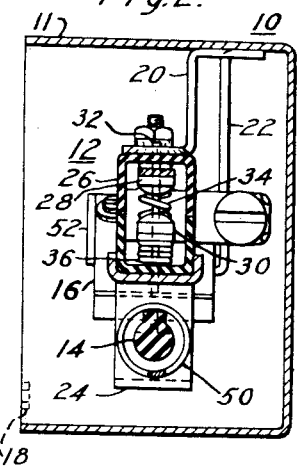
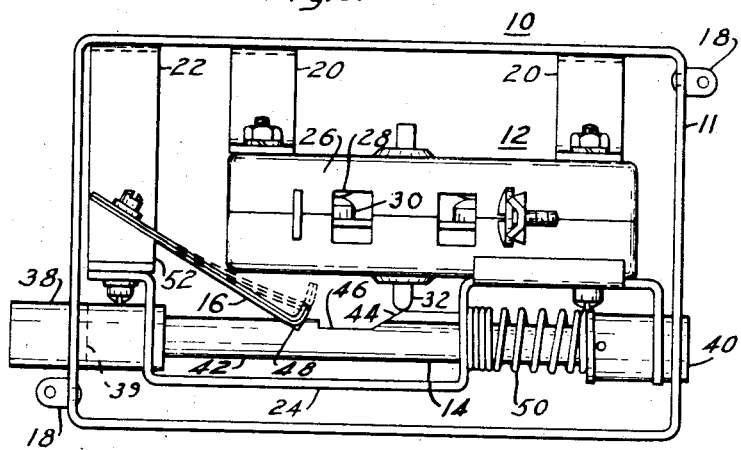
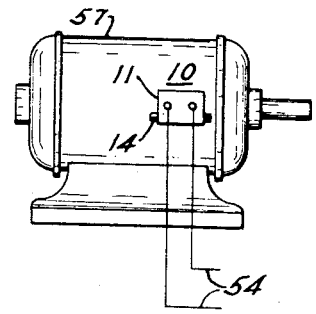
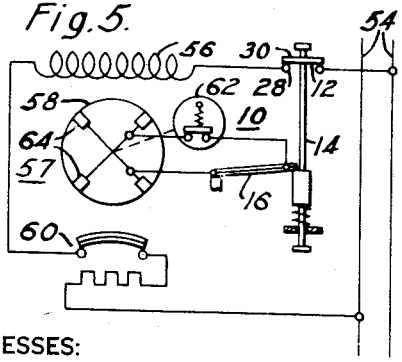
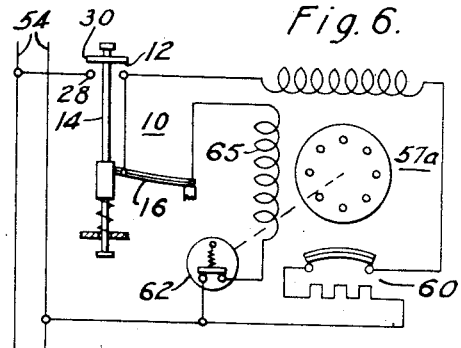
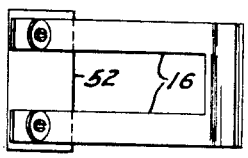
WITNESSES:
INVENTOR
Francis J. Johns.
BY
ATTORNEY Patented May 4, 1943

2,318,076

UNITED STATES PATENT OFFICE 2,318,076

MOTOR PROTECTIVE DEVICE

Francis J. Johns, Pittsburgh, Pa., assignor to Westinghouse Electric & Manufacturing Company, East Pittsburgh, Pa., a corporation of Pennsylvania Application May 31, 1940, Serial No. 338,124

5 Claims. (Cl. 172—276)

My invention relates to thermal protective devices for rotating electrical equipment, and more particularly, to devices for thermally protecting and starting single-phase alternating-current motors.

An object of my invention is to provide a motor starting device having a thermally actuated tripping member which is adapted to release the device so as to deenergize the motor under predetermined starting conditions.

A further object of my invention is to provide a motor protective device which may be used for manually connecting or disconnecting a motor to a power supply and which will automatically disconnect the motor from such power supply under predetermined rotative contions of the rotor.

Another object of my invention is to provide a manually operable circuit maker and breaker having a thermally responsive circuit-deenergizing member which is adapted to maintain a circuit-energized position during predetermined operating conditions.

Other objects of my invention will either be pointed out specifically in the course of the following description of a device embodying my invention, or will be apparent from such description.

In the accompanying drawing:

Figure 1 is an elevational and partial sectional view of the device embodying my invention shown in one of its operative positions;

Fig. 2 is a sectional view taken along the line II—II of Fig. 1;

Fig. 3 is a view similar to Fig. 1, illustrating a device in a second operative position;

Fig. 4 is an elevational view of a dynamo-electric machine with the device embodying my invention attached thereto;

Fig. 5 is a schematic diagram of the device shown in Fig. 1 associated with a repulsion type motor;

Fig. 6 is a schematic wiring diagram illustrating the device embodying my invention associated with a squirrel-cage type electric motor; and Fig. 7 is a top view of the thermal element associated with the device embodying my invention.

Referring to the accompanying drawing, in which like reference characters indicate like parts in the several figures, I show a manually-operable thermally-actuable switching device 10 comprising a housing or supporting structure 11, contact structure 12, latching member 14, and a bimetallic tripping member 16 adapted to engage the latching member 14 during normal operations of the device.

The supporting structure or housing 11 is substantially a box-shaped structure formed of light sheet metal in any well known manner. Suitable flanges or brackets 18 are rigidly attached to the side walls of such housing or may be formed therein to provide means for attaching the housing to, say, a motor with which such electrical device 10 is electrically associated. Brackets 20, preferably Z-shaped, are rigidly attached to substantially the central portion of the upper side of the housing 11 and are positioned within such housing to afford means of mounting the contact structure 12, as hereinafter described. A relatively elongated U or Z-shaped bracket 22 is positioned within the housing 11 relatively close to one end thereof to provide means for mounting the bimetallic tripping member 16 and latching member 14. The latching member 14 is slidably mounted within the housing 11 by means of an irregular S-shaped bracket which is rigidly attached to the bracket 22 at one end and to the contact structure 12 at the other end. A plurality of apertures (not shown) are located within the S-shaped bracket 24 to permit the latching member 14 to be slidably mounted therein, as hereinafter described in greater detail. It is to be understood, however, that the cooperating parts of the device 10 embodying my invention may be attached to or supported by and housed in any other suitable structure.

The contact structure 12 comprises, in this instance, a box-shaped housing 26, preferably formed of any suitable insulating material, which is adapted to support stationary contacts 28 and a movable contact or jumper arm 30 in a well known manner. The jumper 30 is adapted to move in a vertical direction so as to bridge the stationary contacts, when in an engaged position. Such contact arm is rigidly attached to a vertically moving shaft 32 which is adapted to extend through the housing 26. A plurality of resilient members 34 and 36 are positioned about the shaft 32 and are adapted to buck or move against each other. The resilient member 34 is positioned above the contact or jumper arm 30 and is adapted to bias the arm and shaft downwardly. The resilient member 36 is positioned about the shaft 32 below the jumper arm 30 and is adapted to bias such arm upwardly. However, the resilient member 34 has a greater biasing action than resilient member 36 so as to bias the jumper arm 30 into a lower, open or inoperative position. The shaft 32 is adapted to extend downwardly from the contact structure 12 so as to engage the latching member 14, which in turn, operates such contacts through the shaft 32, as hereinafter described.

The latching member 14 comprises, in this instance, a substantially cylindrically-shaped member which preferably extends out of the housing 11 on either side thereof. The latching member, by extending outside the housing 11 at both ends, is adapted to be manually moved from one position to another by means of an operator pressing against the enlarged portions 38 or 40 thereof, as hereinafter described. However, by having the member 14 shortened or cut off along line 39 (see Figs. 1 and 3), so that such member will not extend out of the left side of the supporting structure, it follows that the cooperating contacts can only be manually closed and that they cannot be manually opened or disengaged. The member 14 is irregular in shape and has enlarged portions 38 and 40 at each end thereof with an elongated undercut portion 42 therebetween. A substantially key-shaped portion 44 is located upon the upper surface of the member 14 at substantially the mid-point of the undercut portion 42. The key-portion 44 is adapted to cooperate with the S-shaped bracket 24 to prevent the member 14 from rotating therein. An elongated flattened notch 46 is formed adjacent the key-shaped portion 44 to provide a bearing surface for the lower end of the shaft 32 of the contact structure 12, whereby such structure may be operated through the horizontal movement of the member 14, as hereinafter described. A V-shaped notch 48 is likewise positioned within the member 14 intermediate the notch portion 46 and the enlarged end portion 38 to provide means for receiving the tripping member 16.

A resilient member 50 is positioned about the latching member 14 so as to engage the central portion of the S-bracket 24 and the enlarged end portion 40 of such member. The resilient member is thus adapted to bias the latching member 14 toward the right or to a contact-disengaged position. However, during the normal operation of the device 10 embodying my invention, the tripping member 16 prevents the biasing action of resilient member 50 from moving the latching member 14 to the inoperative position, as hereinafter described.

The bimetallic tripping member 16 is, in this instance, a U-shaped member (see Fig. 7) which is rigidly attached to the bracket 22 by means of a suitable insulating member 52. The bimetallic tripping member 16 is adapted to be electrically associated with the motor to be protected so as to respond to the speed of rotation thereof, as hereinafter described. In addition, the tripping member 16 is adapted to engage the latching member 14 by resting within the V-shaped notch 48 during the normal operation of the device (see Fig. 3) and to rest upon the central portion 42 of such member after the contact structure has become disengaged (see Fig. 1), as hereinafter described. The bimetallic tripping member 16 may be formed of any desirable bimetallic material so as to have the desired characteristics for the motor with which it is to be associated, in a well known manner.

During the normal operation of the device embodying my invention, such device is rigidly attached to the side of a motor 57 which it is designed to protect. The contact structure 12 is electrically associated with a suitable power supply 54 and the main field winding 56 of the motor structure 57. The wound rotor 58 of such motor is connected in series with the bimetallic tripping member 16 (see Fig. 5) so that the current passing through such rotor will pass through the bimetallic member 16. Accordingly, the movements of the bimetallic member are governed by the rotative speeds of such rotor 58, inasmuch as the current flowing through the rotor varies inversely with the speed thereof. If it be desired, any well known thermal protective structure may be associated with the motor 57 to adequately protect such structure during the normal operations of the motor. Such a bimetallic protective device 60 is illustrated in the Figs. 5 and 6. However, it is to be understood that any other desired structure may be used in lieu thereof.

Assuming the manually operable thermally actuable switching device 10 is in open position and is associated with the repulsion type induction motor illustrated in Fig. 5, the rotor thereof will remain stationary. However, should the enlarged portion 40 of latching member 14 of the device 10 be manually moved to an operative position, such member will cause the shaft 32 to be moved upwardly whereupon the contact jumper 30 will engage the stationary contacts 38 so as to connect the motor to the power supply 54. At this time the rotor 58 will begin to rotate and an abnormally large current will, therefore, flow through such rotor, and likewise through the bimetallic tripping member 16. However, assuming that there is no abnormal load on the rotor 58, such rotor will immediately accelerate to its predetermined operating speed with a proportional decrease in current flowing therethrough, at which time the centrifugal device 62 will cause the brushes 64 of rotor 58 to be raised, in a well-known manner. The bimetallic tripping member 16 will thus be disconnected from the rotor 58, permitting the motor to operate in an uninterrupted manner.

However, assuming that, when the device 10 was manually moved to an operating or engaged position energizing the main field 56, an abnormally heavy load was driven by the rotor 58; such rotor would then accelerate at a dangerously low rate. During the abnormally slow movement of the rotor 58, an extremely large and dangerous quantity of current will flow therethrough. Should this current continue to flow through the rotor, it follows that such member may be destroyed due to abnormal heating thereof. However, inasmuch as the bimetallic tripping member is electrically associated with the rotor 58 during the starting movements thereof, it follows that the abnormal current flowing through the rotor 58 will cause the bimetallic tripping member 16 to heat and flex upwardly from a normal engaged position to an upper or flexed postion (see the dotted lines in Fig. 3). The latching member 14 being free, thus moves to the right or disengaged position with a snap action in response to the biasing action on the resilient member 50. It follows that the shaft 32 of contact structure 12 is thus permitted to lower into the notch 46 of member 14. Contact jumper member 30 moving with the shaft 32, thus becomes disengaged from the stationary contacts 28, deenergizing the motor 57.

Accordingly, it follows that the device embodying my invention, due to its cooperation with the rotor 58, anticipates the heating thereof and disconnects the motor from the power supply within, say, 6 to 8 seconds, so as to protect such rotor from becoming dangerously overheated. It is to be understood that the exact time of deenergization of the motor 57 depends upon the speed of the rotor 58, the current flowing through such rotor being at its greatest value at the starting thereof and diminishing in quantity until the rotor brushes 64 are raised by the centrifugal device 62 in a well known manner.

Assuming that the rotor is attached with a load of such magnitude that the rotor cannot rotate or move the load, it follows that there is developed substantially a short circuit characteristic within the rotor winding, permitting an extremely dangerous quantity of current to flow therethrough. This dangerous quantity of current flowing through the tripping member 16 thus actuates such member within, say 3 to 5 seconds, deenergizing the motor through the cooperation of contact jumper 30 and stationary contacts 28, as hereinabove described.

Therefore, it follows that the manually-operable thermally-actuable switching device 10 embodying my invention may be electrically associated with an electrical motor so as to anticipate the heating characteristics of the rotor and thus prevent such rotor from being dangerously overheated.

It is to be understood that a familiar motor protective device 60 will protect the motor during the normal operation thereof, and that the device 10 embodying my invention merely protects the rotor from abnormal starting conditions which would not normally actuate the protective device 60 quickly enough to prevent the rotor from becoming dangerously overheated.

If it be desired, the device 10 embodying my invention may be incorporated with any other desired motor, such as the split-phase squirrel-cage motor 57a. The device is electrically associated with the so-called starting or split-phase coil 65 so as to protect it from being dangerously overheated during the starting operations of the motor. The device 10 functions as hereinabove described with respect to motor 57 so as to anticipate the dangerous heating of the starting coil 64 and to deenergize the motor 57a if there happens to be an undesirable quantity of current flowing through such starting motor.

As previously noted, it is to be understood that the device embodying my invention is to be used in conjunction with any well-known thermal protective device, inasmuch as the device embodying my invention is used primarily to prevent the starting currents associated with the starting windings of the motor from becoming dangerously overheated during an abnormal heavy load. The device embodying my invention does not function as a thermal protection for the motor during the normal operation thereof.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

I claim as my invention:

1. In combination, a thermal protective device for a motor having a rotor, comprising cooperating contacts for controlling the energization of said motor, a thermally responsive member directly connected to the rotor so as to be directly responsive to the current passing therethrough for disengaging the contacts under predetermined rotating conditions of such rotor, and means operatively associated with the contacts and member for reengaging the contacts.

2. A thermal protective system for a motor having a rotor, comprising cooperating contacts for deenergizing such motor, a thermally responsive element directly connected to the rotor and responsive to the current passing therethrough so as to be inversely responsive to the speed thereof, and means operatively associated with the contacts and element normally in a contact-engaged position adapted to move to a contact-disengaged position in response to the movements of the element.

3. In combination with a single-phase motor having main and rotating windings, a mechanism for controlling the energization of said motor including cooperating contacts, and a starting-overload contact-actuating device, said device being connected in series with the rotating winding only and so as to receive and be directly responsive to the current flowing therethrough for actuating the device into a contact-disengaged position if the rotor fails to reach its normal operating speed within a predetermined time.

4. In combination with a single-phase motor having main and rotating windings, a switch embodying contacts for controlling the energization of the main and rotating windings, a resilient member, an operating member for operating said contacts biased into a contact-disengaged position by such resilient member, and a bimetallic member connected in series with the rotating winding positioned so as to engage the operating member and to retain such member in a contact-engaged position during the normal starting operations of the motor.

5. In a motor switch structure having cooperaing contacts including a stationary and a movable contact biased to an open position by a resilient member, the combination of a plunger movable with the movable contact, a manually operable latching member extending through the switch structure at substantially right angles to the plunger and having a plurality of notches within the surfaces of such member one of which, as the latching member moves from a contact-engaged position to a disengaged position, receives the plunger permitting the plunger and movable contact to be moved to an open position, a second resilient member engaging the latching member to bias it into a contact-disengaged position, and a bimetallic tripping member engaging the latching member within a second notch for normally retaining the latching member in a contact-engaging position.

FRANCIS J. JOHNS.